United States Patent Office 2,703,272
Patented Mar. 1, 1955

2,703,272

PROCESS FOR PRODUCING POTASSIUM CHLORIDE SUBSTANTIALLY FREE OF LEAD IMPURITY

Charles H. Fuchsman, Carlsbad, N. Mex., assignor to International Minerals & Chemical Corporation, a corporation of New York No Drawing. Application December 24, 1949,
Serial No. 135,040

7 Claims. (Cl. 23—89)

This invention relates to a process for producing substantially pure potassium chloride crystals and has particular reference to a process for preparing potassium chloride substantially free of lead.

Certain commercial consumers of potassium chloride and potash require a pure material substantially free of lead. Among these may be mentioned the safety appliance manufacturers and the producers of chemically pure potassium hydroxide. Caustic potash producers using the mercury cathode cell require for optimum results a chemical grade potassium chloride of exceptional purity. Purity specifications on refined potassium chloride require that the lead content not exceed five parts-per-million. The use of potash for safety appliances also requires a substantially lead free material.

Heretofore, potassium chloride has been concentrated by subjecting ores containing potassium chloride such as sylvinite to froth flotation and then to crystallization treatments. However, the potassium chloride produced by flotation processes contains more than five parts-per-million of lead, and unlike other trace impurities lead is known to concentrate in potassium chloride crystallizing from aqueous solution containing minute concentrations of lead.

It is an object of the present invention to provide a simple economical process for the removal of lead from potassium chloride.

It is a further object of the invention to provide a process for the production of refined potassium chloride having a lead content of less than five parts-per-million.

It is a further object of the invention to minimize lead impurities in the potassium chloride crystals by reducing the quantity of lead in the hot aqueous solution from which the potassium chloride is crystallized.

Additional objects will be apparent on a fuller understanding of the process as hereinafter described in detail.

It has been discovered that in an aqueous unsaturated potassium chloride solution, containing lead and water insoluble adsorbent material, the solubility of lead decreases as the temperature is increased. The proportion of lead retained in the suspended water insoluble solids is increased at elevated temperature. When the insoluble solids are separated from a boiling potassium chloride solution, the potassium chloride crystallized upon evaporation of the resultant solution contains less than five parts-per-million of lead.

This retrograde solubility temperature relationship holds for aqueous potassium chloride solutions saturated or less than saturated at atmospheric temperatures in which the potassium chloride concentration is constant so that the solution becomes unsaturated upon heating. On the other hand, the solubility of lead increases as the temperature increases in hot saturated aqueous potassium chloride solutions, i. e., saturation is maintained with rising temperature through the presence of excess solid phase potassium chloride.

The invention embodies the further discovery that the equilibrium existing between the lead content of the suspended solid constituents and of the liquor is altered by varying the hydrogen ion concentration. If the hydrogen ion concentration of the unsaturated boiling potassium chloride solution is decreased, prior to removal of the solid constituents, the concentration of lead in the solution is decreased, and is increased with respect to the solid constituents. The potassium chloride crystallized from the solution from which the solid constituents have been removed is substantially free of lead, i. e., contains less than five parts-per-million of lead with a good crystal yield.

The water insoluble adsorbent material in the aqueous potassium chloride feed solution are preferably the insoluble impurities present in muriate of potash produced from sylvinite ore such as is mined and refined at Carlsbad, New Mexico. The water insoluble adsorbent materials contained in sylvinite ore mined at Carlsbad, New Mexico, are principally montmorillonite-type clays. However, other solid constitutents may be employed. Insoluble absorbent materials such as fuller's earth, paper pulp, magnesium silicate and the like may be added to potassium chloride feed solutions.

While the precise form of the lead impurities present in the muriate of potash solution prepared from ores such as sylvinite is unknown, the lead is thought to be in a combined, charged, or ionized state. As used herein in the description and claims, the word "lead" is used in the sense of combined, charged, or ionized lead.

From the foregoing it is apparent that the principles of the instant novel process as previously mentioned may be employed with several different variations. For example, the amount of lead removed with the insoluble constituents of muriate of potash produced from sylvinite ore at Carlsbad is increased by either of the following methods or a combination of both.

1. Heating of an aqueous solution of muriate of potash prior to the removal of the insoluble constituents.
2. Adjustment of the pH of the aqueous solution of muriate of potash to between about 8.0 and about 11.0 prior to the removal of the insoluble constituents.

Either of these procedures is effective when used on aqueous muriate of potash solutions which are saturated or less than saturated at atmospheric temperatures. However, as the potassium chloride concentration is increased above these concentrations (i. e., a solution saturated at elevated temperatures) a greater proportion of lead is found in the liquid phase and partially nullifies the temperature effect. Since commercial applications usually involve potassium chloride solutions saturated at elevated temperatures, it is preferred that a combination of still further elevating the temperature and pH adjustment be employed in order to remove the lead from the potassium chloride solution.

In the preferred embodiment of the invention, "doubly centrifuged muriate of potash" is dissolved in water at room temperature or an elevated temperature. The resultant muriate of potash solution may be saturated or less than saturated as long as the potassium chloride concentration does not increase with temperature (i. e., the solution is unsaturated at the higher temperature at which the solid impurities are to be removed) and the required temperature increase is within practical operating limits.

As herein used the term "doubly centrifuged muriate of potash" means muriate of potash having substantially the following analysis: K—51.5, Mg—0.11, Na—0.33, Cl—47.3, SO$_4$—0.21, Pb—0.0009, Ca—0.04, Insoluble—0.36, all per cent by weight dry basis.

While "doubly centrifuged muriate of potash" is preferred, "singly centrifuged muriate of potash" may also be employed. By the term "singly centrifuged muriate of potash" as herein used is meant muriate of potash of substantially the following analysis: K—50.3, Mg—0.15, Na—1.08, Cl—47.1, SO$_4$—0.82, Pb—0.0009, Ca—0.05, Insoluble—0.37, all per cent by weight dry basis. However, it is not intended to limit the process to muriates of potash of these analyses. The feed material employed is any impure muriate of potash containing lead compounds.

Preferably sufficient sodium hydroxide is added to the muriate of potash solution to obtain a pH of between about 9.5 and about 11.0. Athough sodium hydroxide is preferred, any inorganic alkali metal compound or alkaline earth metal compound may be employed to adjust the pH. The term "alkali metal compound" includes ammonia. Thus, the caustic may be supplied as sodium hydroxide, potassium hydroxide, sodium carbonate, potassium carbonate, ammonia, calcium hydroxide, barium hydroxide and the like. Obviously, caustic which will introduce impurities which will contaminate the final product, should not be added. While adjustment to a pH of between about 9.5 and about 11.0 is preferred, less favorable but successful results are obtained by adjusting to a pH of between about 8.0 and about 9.5. A higher pH can be used for more complete lead removal, however for practical purposes the above pH range is preferred. The alkaline mixture is heated to any elevated temperature in excess of that at which the particular solution is saturated and filtered or settled and decanted immediately. The purity of the potassium chloride crystals ultimately produced is equally high, regardless of whether the insoluble lead impurities are removed by filtration or by settling and decantation of clarified liquid from the solid impurities. In the preferred embodiment, in which sodium hydroxide is used to adjust the pH to between about 9.5 and about 11.0, the crystallized potassium chloride produced from the clarified solution contains less than five parts-per-million of lead, with an economically acceptable crystal yield.

The length of time which the alkaline mixture is maintained at an elevated temperature or at the boiling point prior to the removal of solid impurities is not critical.

The following examples are intended merely as illustrations of the instant novel process and are not intended to be in limitation thereof.

EXAMPLE I

In order to illustrate the effect of removing the water insoluble impurities from a hot as compared to a cold solution of muriate of potash, two 20 per cent aqueous solutions of "doubly centrifuged muriate of potash," with analysis as indicated, were prepared. In test number one, the muriate of potash was dissolved at room temperature. In test number two, muriate of potash was dissolved while keeping the solution boiling. Both samples were immediately filtered to remove insoluble impurities and then boiled to remove water approximately equal to one-third of the weight of the original solution. The concentrated solutions were then cooled slowly and the resultant potassium chloride crystals filtered off at room temperature. The data in Table I indicates that crystals produced from the liquor which has been heated prior to the removal of solid impurities contain only one part-per-million of lead, whereas the crystals produced from the unheated liquor contain 8.9 parts-per-million of lead.

*Table I*

|  | Pb in evaporated liquor (p. p. m.) | Pb in crystals (p. p. m.) |
|---|---|---|
| No. 1—cold | 0.43 | 8.9 |
| No. 2—hot | 0.19 | 1.0 |

EXAMPLE II

An 18 per cent aqueous solution of "doubly centrifuged muriate of potash" of analysis indicated was prepared while keeping the solution boiling, and insoluble solids were filtered from the hot solution. Water was then removed by evaporation until the solution was 58 per cent of its original weight. The potassium chloride crystals were filtered off. The mother liquor was then evaporated to 79 per cent of its original weight, and a second set of potassium chloride crystals was removed.

An inspection of Table II shows that although lead has a marked tendency to concentrate in the solid potassium chloride, most of the lead is removed with the solid impurities while the potassium chloride is in solution. The filtered liquor from which solid impurities have been removed contans only 0.18 part-per-million of lead. Substantially all of the lead remaining in this liquor is incorporated into the potassium chloride crystallized from it, and the filtrate from which the crystals have been separated is substantially free of lead. Upon further concentration of this filtrate very pure potassium chloride containing 0.05 part-per-million of lead crystallizes therefrom.

*Table II*

|  | Pb (p. p. m.) |
|---|---|
| Filtered liquor | 0.18 |
| 1st crystals | 1.80 |
| 2nd mother liquor | 0.00 |
| 2nd crystals | 0.05 |

EXAMPLE III

To study the effect of pH on the lead content of the potassium chloride crystals, two solutions containing 500 grams of "doubly centrifuged muriate of potash" dissolved in 1000 grams of distilled water were prepared. The first solution was used as a control. To the second solution was added 354 milligrams of chemically pure sodium hydroxide. Each sample was heated to boiling and then filtered immediately. The pH and the lead content of the filtrates were determined. Table III indicates the pH of each filtrate and the parts-per-million of lead found in each. Potassium chloride crystals obtainable from the filtrate produced by following the process of experiment two usually contain less than 1 part-per-million of lead while those from filtrate obtained by following the process of experiment one usually contain 6–10 parts-per-million of lead.

*Table III*

| Expt. | Pb in filtrate (p. p. m.) | pH |
|---|---|---|
| 1 | 0.53 | 6.6 |
| 2 | 0.06 | 9.8 |

When the "singly centrifuged muriate of potash" from the flotation plant was used instead of the "doubly centrifuged muriate of potash," additional caustic soda was needed to raise the pH to the preferred range of 9.5 to 10.0. This is reasonably explained by the fact that as previously shown the magnesium content of the "singly centrifuged muriate of potash" is much higher than it is after repulping and recentrifuging. Consequently, the effect of the originally added caustic is somewhat cancelled by the buffering action of the magnesium. If prior to removal of solid impurities the pH of the hot solution is increased to between about 8.1 and about 8.7 by using the same amount of caustic soda as hereinbefore stated, there is a buffering action due to the presence of soluble magnesium impurities thus preventing the solution from reaching a pH of between about 9.5 and about 10.0. In this case the lead concentration in the liquor does not exceed about 0.4 part-per-million. However, if the pH is raised to between about 9.5 and about 10.0 which is above the buffering range of magnesium, the lead content of the liquor is reduced to about 0.06 part-per-million. The potassium chloride crystallized from the high pH liquors contains less than 2 parts-per-million of lead.

Having now fully described and illustrated the character of the invention, what is desired to be secured by Letters Patent is:

1. A process for producing potassium chloride substantially free from lead by removing lead impurities from an aqueous potassium chloride solution containing lead impurities and water insoluble adsorbent material selected from the group consisting of fuller's earth, magnesium silicate, and water insoluble impurities present in sylvinite ore mined at Carlsbad, New Mexico, which process utilizes an inorganic alkaline compound as the sole added reagent and which process comprises heating said potassium chloride solution to an elevated temperature, adjusting the pH of the hot solution to between about 8.0 and about 11.0 with an inorganic alkaline compound, removing solids from the hot solution, said solids containing said lead impurities, removing water from the solution to obtain a saturated solution with respect to potassium chloride at an elevated temperature, cooling the resultant saturated solution and crystallizing potassium chloride therefrom, the resultant crystalline potassium chloride being substantially free from lead impurities.

2. A process for producing potassium chloride substantially free from lead by removing lead impurities from an aqueous potassium chloride solution containing lead impurities and water insoluble adsorbent materials present in sylvinite ore mined at Carlsbad, New Mexico, which process utilizes an inorganic alkaline compound as the sole added reagent and which process comprises heating said potassium chloride solution to an elevated temperature, adjusting the pH of the hot solution to between about 8.0 and about 11.0 with an inorganic alkaline compound, removing solids from the hot solution, said solids containing said lead impurities, removing water from the solution to obtain a saturated solution with respect to potassium chloride at an elevated temperature, cooling the resultant saturated solution and crystallizing potassium chloride therefrom, the resultant crystalline potassium chloride being substantially free from lead impurities.

3. A process for producing potassium chloride substantially free of lead by removing lead impurities from an aqueous potassium chloride solution containing lead impurities and water insoluble adsorbent material selected from the group consisting of fuller's earth, magnesium silicate, and water insoluble impurities present in sylvinite ore mined at Carlsbad, New Mexico, which process utilizes an inorganic alkaline compound as the sole added reagent, and which process comprises heating said solution to an elevated temperature, maintaining the solution saturated with respect to potassium chloride at the elevated temperature, adjusting the pH of the resultant hot saturated solution to between about 8.0 and about 11.0 with an inorganic alkaline compound, removing solids from the hot solution, said solids holding adsorbed lead impurities, cooling the saturated solution, and crystallizing potassium chloride therefrom, the resultant crystalline potassium chloride being substantially free of lead impurities.

4. A process for producing potassium chloride substantially free of lead by removing lead impurities from an aqueous potassium chloride solution containing lead impurities and water insoluble adsorbent material selected from the group consisting of fuller's earth, magnesium silicate, and water insoluble impurities present in sylvinite ore mined at Carlsbad, New Mexico, which process utilizes an inorganic alkaline compound as the sole added reagent, and which process comprises heating said solution to a temperature higher than the temperature at which the solution is substantially saturated with respect to potassium chloride, but lower than the boiling point of the solution, adjusting the pH of the resultant hot solution to between about 8.0 and about 11.0 with an inorganic alkaline compound, removing solids from the hot solution, said solids holding adsorbed lead impurities, removing water from the solution to obtain a saturated solution with respect to potassium chloride at an elevated temperature, cooling the resultant saturated solution, and crystallizing potassium chloride therefrom, the resultant crystalline potassium chloride being substantially free of lead impurities.

5. The process of claim 4 in which the pH is adjusted to between about 9.5 and about 11.0.

6. The process of claim 5 in which the inorganic alkaline compound is sodium hydroxide.

7. The process of claim 5 in which the inorganic alkaline compound is potassium hydroxide.

References Cited in the file of this patent

UNITED STATES PATENTS

| | | |
|---|---|---|
| 1,873,329 | Ritchie et al. | Aug. 23, 1932 |
| 2,470,822 | Johnson et al. | May 24, 1949 |
| 2,613,133 | Anderson | Oct. 7, 1952 |

OTHER REFERENCES

"Catalog of Baker's Analyzed C. P. Chemicals," Jan. 1, 1935, page 95. Published by J. T. Baker Chem. Co., N. Y.

"Manual on Fertilizer Manufacture," by V. Sauchelli, pages 73, 74 (Apr. 1946). The Davison Chem. Corp., Baltimore 3, Md.

"Handbook of Chem. and Physics," 27th ed., pages 398–399. Chemical Rubber Pub. Co., Cleveland, Ohio.

"Manures," by E. W. Bell, 1897 ed., pages 68, 69. The Cable Printing and Publishing Co., Ltd., London.

"Inorganic and Theoretical Chem.," by J. W. Mellor, vol. 7, 1927 ed., pages 568, 569. Longmans, Green and Co., N. Y.